Patented Dec. 1, 1953

2,661,363

UNITED STATES PATENT OFFICE 2,661,363

PERESTERS OF PEROXYCARBOXYLIC ACIDS

Frank H. Dickey, Berkeley, Calif., assignor to Shell Development Company, Emeryville, Calif., a corporation of Delaware No Drawing. Application January 18, 1952, Serial No. 267,204

13 Claims. (Cl. 260—453)

This invention relates to a new class of organic compounds. More particularly, the invention relates to a new class of organic peresters, and to their utilization, particularly as polymerization catalysts for vinyl monomers.

Specifically, the invention provides novel compounds having unexpected properties as polymerization catalysts comprising organic peresters which may be theoretically described as peresters of non-aromatic peroxycarboxylic acids and aromatic-substituted aliphatic alcohols, and particularly the alkarylalkanols and the arylalkanols.

This application is a continuation-in-part of my application No. 715,132, filed December 9, 1946, now abandoned.

It is known that vinyl monomers, such as vinyl chloride, may be polymerized with the aid of peroxide catalysts, such as benzoyl peroxide, ter-butyl peroxybenzoate and di-tertiary-butyl di-peroxyphthalate. While these catalysts generally give satisfactory yields of polymer, they possess certain shortcomings which place a considerable restriction on their use for many commercial applications. These known catalysts, for example, tend to cause considerable discoloration of the finished polymer. In addition, they are generally inactive at low temperatures and to obtain a satisfactory rate of polymerization, the process must be conducted at a relatively high temperature. This is undesirable as the use of the high temperatures yields polymers having low molecular weights, poor color and form-stability at room temperatures, and inferior mechanical properties.

It is an object of the invention, therefore, to provide a new class of polymerization catalysts. It is a further object to provide new perester polymerization catalysts that do not cause discoloration of the resulting polymer. It is a further object to provide novel perester catalysts that are effective at low reaction temperatures. It is a further object to provide new organic peresters that can produce polymers having excellent physical properties at a relatively fast rate at low reaction temperatures. It is a further object to provide novel polymerization catalysts that are active in bulk, emulsion or suspension systems. It is a further object to provide a new class of organic peresters having many unique and valuable properties. Other objects and advantages of the invention will be apparent from the following detailed description thereof.

It has now been discovered that these and other objects may be accomplished by the novel compounds of the invention which may be theoretically described as peresters of non-aromatic peroxycarboxylic acids and aromatic-substituted aliphatic alcohols, such as the alkarylalkanols and arylalkanols. It has been found that these particular peresters are unexpectedly superior polymerization catalysts for the vinyl monomers as they have no tendency to cause discoloration of the resulting polymer. In addition, these particular peresters are able to initiate polymerization at low reaction temperatures at a relatively fast rate. Thus, while the conventional peroxide catalysts described above show little if any activity in polymerizing monomers, such as vinyl chloride, at temperatures of the order of 45° C. or below, the above-described special type of peresters show considerable activity at these temperatures and can form satisfactory yields of polymer at the low reaction temperatures. The polymers formed at these lower temperatures have relatively high molecular weights and improved mechanical properties.

The discovery that the above-mentioned peresters are superior polymerization catalysts was indeed surprising in view of the fact that other peroxides containing aromatic nuclei, such as benzoyl peroxide, tertiary-butyl peroxybenzoate, and tertiary-butyl peroxytoluate were unsatisfactory, particularly because of their discoloration of the resulting polymer. Evidence of the unexpected properties of the afore-mentioned peresters of the present invention over these known catalysts may be found in the examples cited hereinafter.

The novel peresters of the invention require special methods of preparation as described hereinafter, but for clarity they will be described herein and in the appended claims as being derived from the non-aromatic peroxycarboxylic acids and the aromatic-substituted aliphatic alcohols. The expression "non-aromatic peroxycarboxylic acid" as used herein refers to those compounds that are free of aromatic nuclei and possess at least one percarboxyl group, i. e., a

group. These acids may be aliphatic, cycloaliphatic or heterocyclic and may be saturated or unsaturated. Examples of such peracids include peroxyacetic acid, peroxybutyric acid, peroxycaproic acid, peroxycaprylic acid, peroxychloroacetic acid, peroxydichlorocaproic acids, peroxyacrylic acid, peroxypentenoic acid, peroxycyclohexanoic acid, peroxychlorocyclohexanoic acid, peroxycyclopentenoic acid, peroxystearic acid, peroxylauric acid, peroxydecanoic acid, peroxy-2-octenoic acid, peroxy-2,4-octanedioic acid, diperoxysuccinic acid, diperoxy-1,4-cyclohexanedicarboxylic acid, diperoxyadipic acid, diperoxysebacic acid, diperoxy-4-chloro-1,3-cyclohexanedicarboxylic acid, diperoxyglutaconic acid, diperoxyhydromuconic acid, triperoxy-1,2,4-butanetricarboxylic acid, triperoxy-1,2,6-octanetricarboxylic acid, triperoxy-1,3,5-hexanetricarboxylic acid, peroxychlorostearic acid, peroxypelargonic acid, and peroxyoleic acid.

Preferred non-aromatic peroxycarboxylic acids are the peroxyalkanoic acids and peroxyalkenoic acids containing at least two carbon atoms and their halo-substituted derivatives, the peroxycycloalkanoic acids and peroxycycloalkenoic acids containing at least 6 carbon atoms and their halo-substituted derivatives, the diperoxyalkanedioic acids and diperoxyalkenedioic acids containing at least four carbon atoms and their halo-substituted derivatives, the diperoxycycloalkanedioic acids and the diperoxycycloalkenedioic acids containing at least 7 carbon atoms and their halo-substituted derivatives, and the triperoxyalkanetroic acids and the triperoxyalkenetrioic acids containing at least five carbon atoms and their halo-substituted derivatives, such as peroxyacetic acid, peroxychloroacetic acid, peroxytrichloroacetic acid, peroxybutyric acid, peroxychlorobutyric acid, peroxycaproic acid, peroxypelargonic acid, peroxystearic acid, peroxychlorooctanoic acid, peroxyacrylic acid, peroxy-2-octenoic acid, peroxy-2,4-hexadienoic acid, diperoxysuccinic acid, diperoxyadipic acid, diperoxyglutaconic acid, diperoxychlorosuccinic acid, diperoxychloro-2,4-hexadiene-1,6-dioic acid, triperoxy-1,2,4-butane-tricarboxylic acid and triperoxy-1,2,4-chlorobutanetricarboxylic acid.

Particularly preferred peroxycarboxylic acids are the peroxyalkanoic and peroxyalkenoic acids containing from 2 to 20 carbon atoms, and more preferably from 5 to 15 carbon atoms, and the peroxyalkanedioic acids and the diperoxyalkenedioic acids containing from 4 to 20 carbon atoms, and more preferably from 5 to 15 carbon atoms.

Coming under special consideration, particularly because of the high activity of their peresters at the low reaction temperatures are the halo-substituted and particularly the polychloro-substituted peroxyalkanoic acids, such as peroxytrichloroacetic acid.

The alcohols theoretically employed in the esterification of the above-described peroxycarboxylic acids are the aromatic-substituted aliphatic alcohols, such as benzyl alcohol, triphenylcarbinol, phenyldibutylcarbinol, cyclohexyldiphenylcarbinol, cyclopentyldimethylcarbinol, p-isopropylbenzyl alcohol, p-methylbenzyl alcohol, p-tertiary-butylbenzyl alcohol, chlorobenzyl alcohol, p-isohexylbenzyl alcohol and the like. Preferred alcohols are those of the formula

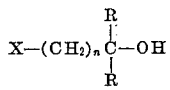

wherein each R is a member of the group consisting of hydrogen, alkyl, cycloalkyl, aryl or alkaryl radicals, X is a member of the group consisting of aryl or alkaryl radicals and n is number from 0 to 5, such as benzyl alcohol, triphenylcarbinol, phenyldihexylcarbinol, 1-hydroxy- 3 -phenylbutane, 1-hydroxy,1,1-dimethyl -4- phenylpentane, and the like.

Particularly preferred alcohols are the aryl- alkyl alcohols and alkarylalkyl alcohols containing from 7 to 18 carbon atoms, and still more particularly the aryl(dialkyl)alkyl alcohols and the alkaryl(dialkyl)alkyl alcohols, such as alpha,alpha-dimethyl-p-methylbenzyl alcohol, alpha,alpha-dimethylbenzyl alcohol, alpha,alpha-dimethyl-p-isohexylbenzyl alcohol, alpha,alpha-dibutyl-p-hexylbenzyl alcohol, alpha,alpha-dibutyl-p-tertiary-butylbenzyl alcohol, and alpha,alpha-dioctylbenzyl alcohol. Coming under special consideration, particularly because of the fine activity of the resulting peresters in the polymerization of the vinyl monomers, are the aryl(1,1-dialkyl)methyl alcohols and the alkaryl(1,1-dialkyl)-methyl alcohols containing from 9 to 15 carbon atoms.

The novel peresters of the invention are theoretically derived from any one of the above-described peroxycarboxylic acids and any one or more of the above-described aromatic-substituted aliphatic alcohols. In the case of the polyperoxycarboxylic acids, at least one of the percarboxyl groups should be esterified with the above-described aromatic-substituted aliphatic alcohols and the other percarboxyl group or groups may be free or esterified with other types of alcohols, preferably the saturated aliphatic alcohols, such as methyl alcohol, butyl alcohol, allyl alcohol, hexanol, octanol, and still more preferably the tertiary monohydric alcohols, such as tertiary butyl alcohol, tertiary hexyl alcohol, tertiary amyl alcohol, and the like.

Examples of the novel peresters of the invention are triphenyl-carbinyl peroxyacetate, dimethylbenzyl peroxycaproate, diphenylbutylcarbinyl peroxycaprylate, alpha,alpha-dimethyl-p-methylbenzyl peroxyacrylate, triphenylcarbinyl peroxylaurate, di-(triphenylcarbinyl) diperoxysuccinate, alpha,alpha-dimethl -p.-butylbenzyl peroxychloroacetate, dimethylbenzylperoxychlorocaproate, di-(cyclohexyldiphenylcarbinyl) diperoxyadipate, di-(alpha,alpha-p-isopropylbenzyl) peroxyglutaconate, di-(alpha,alpha-diethyl-p-methylbenzyl) diperoxysebacate, and tri-(diphenylbutylcarbinyl) triperoxy-1,2,4-butanetricarboxylate.

The preferred peresters of the invention, i. e., those theoretically derived from the above-described preferred acids and the preferred arylalkyl alcohols and the alkarylalkyl alcohols containing from 7 to 18 carbon atoms, may be exemplified by the following: alpha,alpha-dimethyl-p-butylbenzyl peroxyacetate, alpha,alpha-dibutyl-p-isopropylbenzyl peroxycaproate, alpha,alpha-dibutylbenzyl peroxylaurate, alpha,alpha-dihexylbenzyl peroxypelargonate, di-(dimethylbenzyl) diperoxysuccinate, di-(alpha,alpha-dimethyl-p-isobutylbenzyl) diperoxyadipate, di-(phenyldibutylhexyl) diperoxyglutaconate, di-(phenyldimethylamyl) diperoxychlorosuccinate, and di-(phenyldimethylhexyl) diperoxychloroadipate.

The particularly preferred peresters, i. e., those derived from the peroxyalkanoic acids, peroxyalkenoic acids, diperoxyalkanedioic acids, diperoxyalkenedioic, their halo derivatives and aryl(1,1-dialkyl) methyl alcohols and the alkaryl(1,1-dialkyl)methyl alcohols, may be exemplified by alpha,alpha-dimethylbenzyl peroxyacetate, alpha,alpha-dimethyl - p - butylbenzylperoxyacrylate, alpha,alpha-dimethyl - p - isopropylbenzyl peroxylaurate, di(alpha,alpha-dimethylbenzyl) diperoxysuccinate, and di(alpha,alpha-dimethyl-p-butylbenzyl) diperoxyadipate.

As indicated, the above-described monoperesters cannot be obtained by direct esterification of the peracid with the alcohol as the hydroxyl group of the water of esterification must come from the acid and not the alcohol. Special methods must, therefore, be employed for the preparation of these particular compounds. The more preferred method comprises reacting a hydroperoxide with the desired acyl halide in the presence of an alkali component.

The hydroperoxides used in the preparation are those derived from the afore-described aromatic-substituted aliphatic alcohols, such as diphenylmethylcarbinyl hydroperoxide, cyclohexyldiphenylcarbinyl hydroperoxide, p-isopropylbenzyl hydroperoxide, p-tertiary-butylbenzyl hydroperoxide, alpha,alpha-dimethylbenzyl hydroperoxide, alpha,alpha - dimethyl-p-butylbenzyl hydroperoxide, alpha, alphadimethyl-p-isopropylbenzyl hydroperoxide, phenyldibutylcarbinyl hydroperoxide, phenyldibutylamyl hydroperoxide, and alpha,alphadimethyl-p-octylbenzyl hydroperoxide.

The above-noted hydroperoxides may be obtained by oxidizing the corresponding aromatic-substituted aliphatic hydrocarbon. Alpha,alpha-dimethylbenzyl, hydroperoxide, for example, may be obtained by oxidizing cumene. A detailed description of a method for the preparation of the hydroperoxides may be found in Vaughan et al.— U. S. 2,403,772.

The acyl halides used in the preparation of the novel peresters are those derived from acids corresponding to the above-described peracids, such as acetyl chloride, butyryl chloride, hexanoyl chloride, octanoyl chloride, decanoyl chloride, succinyl chloride, adipyl chloride, glutaconyl chloride, pimelyl chloride, sebacyl chloride, chlorosuccinyl chloride, chloroacetyl chloride, chlorobutyryl chloride, and the like The alkali employed in the process includes pyridine, sodium or potassium bicarbonate, or sodium hydroxide. A sufficient amount of the alkali should be used to insure that the reaction mixture will be alkaline throughout the reaction, i. e., an excess over that necessary to react with the acyl halide.

The reaction may be conducted in the presence or absence of solvents or diluents. In the case of the more viscous peroxides, inert solvents, such as carbon tetrachloride, heptane, octane and the like, may advantageously be employed.

The proportions of hydroperoxide and acyl halide employed may vary over a considerable range. It is generally desirable to react the acyl halide with at least a chemical equivalent amount of the hydroperoxide. The expression "chemical equivalent amount" as used herein refers to the amount of the hydroperoxide required to furnish approximately one peroxide group for every acyl group to be reacted. Preferably the acyl halide and hydroperoxide are reacted in chemical equivalent ratios of 1:1 to 1:1.5, respectively.

The reaction is ordinarily conducted in the liquid phase in a vessel equipped with suitable heating or cooling means. Preferably, the reaction is conducted in a batch operation with the hydroperoxide, alkali and solvent, if any, being added first and the acyl halide being added in small quantities over a period of time. The reaction temperature will vary somewhat with the reactants. In some instances the reaction proceeds at a rapid rate at temperatures as low or lower than 0° C., while in other cases it may be necessary to raise the temperature to 80° C., or above to obtain a satisfactory reaction rate. Preferred temperatures range from 0° C. to 100° C. Atmospheric, superatmospheric, or subatmospheric pressures may be utilized as desired.

The peresters may be recovered from the reaction mixture by any suitable means, such as precipitation, extraction, filtration, fractional distillation, and the like.

The novel peresters of the invention possess many unusual properties which make them particularly useful and valuable in industry. They are valuable, for example, as bleaching agents for flour, etc., as sterilizing agents or components for antiseptic compositions, as driers for oils as linseed and tung oil, and as catalysts for free radical chain reactions, such as the addition of polyhalogenated hydrocarbons to olefins, and various telomerization reactions as disclosed in U. S. Patents No. 2,348,021, No. 2,418,832, and No. 2,440,801.

The novel peresters are especially valuable as catalysts for the polymerization of vinyl monomers. The expression "vinyl monomers" includes all those organic compounds containing at least one $CH_2=C<$ group in their molecule. Examples of these monomers are styrene alpha-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluoride; the vinyl esters of the inorganic acids, such as the halogen acids and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate; the vinyl esters of the unsaturated acids, such as vinyl acrylate, vinyl crotonate, and vinyl methacrylate; the vinyl ethers, such as vinyl ethyl ether, vinyl butyl ether, and vinyl allyl ether; the vinyl ketones, such as vinyl butyl ketone, and vinyl ethyl ketone; and the allyl derivatives, such as allyl acetate, allyl butyrate, diallyl phthalate, diallyl adipate, methallyl propionate, allyl chloride, methallyl chloride, allyl acrylate, and methallyl methacrylate.

The peresters are also effective as catalysts for the copolymerization of the above-described compounds with other types of polymerizable organic compounds, particularly those containing at least one ethylenic linkage, such as ethylene, the saturated esters of the unsaturated acids, such as diethyl maleate, dibutyl crotonate, and the like.

Polymerization of the vinyl monomers in the presence of the novel perester may be accomplished by a variety of methods. The polymerization may be accomplished in bulk, in a solvent solution or in an aqueous emulsion or suspension. The peresters usually display their maximum catalytic activity in an aqueous emulsion and this is the preferred system to be used in utilizing the peresters. In a preferred method of operation the material to be polymerized is added to a mixture containing water, an emulsifying agent, preferably a pH adjusted, and the perester catalyst, and the resulting mixture maintained at the desired temperature and pressure.

Emulsifying agents that may be employed in the preferred process include the soaps, such as sodium and potassium myristate, laurate, palmitate, oleate, stearate, rosinate and hydroabietate; the alkali metal alkyl or alkylene sulfates, such as sodium lauryl sulfate, potassium stearyl sulfate; the alkali metal alkyl or alkylene sulfonates, such as sodium lauryl sulfonates, potassium stearyl sulfonate, and sodium cetyl sulfate; sulfonated mineral oil, as well as the ammonium salts thereof; and salts of high amines like lauryl amine hydrochloride, and stearyl amine hydrobromide. The amount of the emulsifying agent employed will generally vary between about 0.1% and 6% by weight of the monomer, preferably between 0.1% and 2% by weight of the monomer.

The temperature employed in the polymerization may vary over a considerable range. The advantages of using the novel peresters as catalysts are more prominent, however, when the relatively low temperatures are employed. The preferred temperatures generally range from about 20° C. to about 50° C. Atmospheric, superatmospheric or subatmospheric pressures may be employed as desired.

The polymers formed during the polymerization may be recovered by any of the conventional means, such as addition of coagulating agents, freezing, dehydration, filtration, and the like.

The resulting polymers are substantially colorless products possessing relatively high molecular weights. Plasticized specimens of the polymers possess excellent color stability and increased strength and flexibility over a wide range of conditions. Such products may be used for a variety of commercial applications, such as the formation of rigid plastic articles of various shapes and sizes, surface coating compositions, impregnating agents for textiles, and the like.

To illustrate the manner in which the invention may be carried out, the following examples are given. It is to be understood, however, that the examples are for the purpose of illustration and the invention is not to be regarded as limited to any of the specific conditions cited therein. Unless otherwise specified, parts described in the examples are parts by weight.

*Example I*

3.2 parts (0.018 mole) of pelargonyl chloride was added to a suspension containing 6.6 parts (0.02 mole) of 53% sodium alpha,alpha-dimethylbenzyl hydroperoxide in 50 parts of petroleum ether. The mixture was allowed to stand at room temperature for one hour with occasional stirring. At the end of this time the odor of the acid chloride had disappeared and the solution was washed with 50 parts of water and with two successive 25 part portions of 5% aqueous sodium bicarbonate. The solution was dried over anhydrous sodium sulfate and the solvent removed by evaporation at reduced pressure. 5 parts of product was obtained. It was identified as alpha,alpha-dimethylbenzyl peroxypelargonate. The active oxygen content was determined by hydrolysis in alcoholic base followed by acidification and iodometric analysis for hydroperoxides. Per cent active oxygen found 5.45, theory 5.45.

A mixture containing 1 part of the alpha,-alpha-dimethylbenzylperoxypelargonate produced above and 100 parts of diallyl phthalate gelled in a short period at 65° C. and formed a hard colorless casting. In similar experiments using 1 part benzoyl peroxide at 65° C. and 1 part tertiary-butyl peroxybenzoate at 80° C., the resulting castings had a definite yellow color.

A mixture containing 1 part of alpha-alpha-dimethylbenzyl peroxypelargonate and 100 parts of methyl methacrylate set up in about 15 hours at 43° C., while in a similar experiment using 1 part of tertiary-butyl peroxybenzoate at 43° C., the mixture set up only after 29 hours.

*Example II*

Redistilled pelargonyl chloride (16.8 parts) was slowly added to a solution containing about 12.44 parts of alpha,alpha-dimethyl-p-methylbenzyl hydroperoxide and 20 parts of pyridine in 200 parts of petroleum ether. The mixture was allowed to stand at room temperature with occasional stirring. The mixture was then washed with water and with two successive 50 part portions of aqueous sodium bicarbonate. The solution was dried over sodium sulfate and the solvent removed by evaporation at reduced pressure. The resulting product was similar to that produced in Example I and was identified as alpha,alpha-dimethyl-p-methylbenzyl peroxypelargonate.

A mixture containing 1 part of the alpha,alpha-dimethyl-p-methylbenzyl peroxypelargonate and 100 parts of methyl methacrylate at 40° C. set up in a very short period.

The alpha,alpha-dimethyl-p-methylbenzyl peroxpelargonate produced above was also effective in polymerizing vinyl chloride at 40° C. in an aqueous system containing 100 parts of vinyl chloride, 400 parts of water, 1 part of sodium lauryl sulfate and 0.5 part trisodium phosphate.

*Example III*

A solution containing about 9 parts of succinyl chloride in 15 parts of petroleum ether is added with cooling and stirring to 75 parts of a petroleum ether solution containing about 25 parts of alpha,alpha-dimethyl-p-methylbenzyl hydroperoxide and 25 parts of pyridine. Cooling and stirring is continued for about 30 minutes after the addition has been completed. The mixture is then washed with water and with two successive 50 part portions of sodium bicarbonate and then dried. The solvent is then evaporated and the resulting product identified as di-(alpha,-alpha-dimethyl-p-methylbenzyl) diperoxysuccinate.

The di-(alpha,alpha-dimethyl-p-methylbenzyl) diperoxysuccinate produced above may be used to produce substantially colorless castings from diallyl phthalate and methyl methacrylate and to polymerize vinyl chloride and styrene in an aqueous emulsion.

Peresters having related properties may be obtained by replacing the succinyl chloride in the above-described process with equivalent amounts of each of the following chlorides; adipyl chloride, glutaryl chloride, glutaconyl chloride and the acid chloride of 1,4-cyclohexanedicarboxylic acid.

*Example IV*

About 10 parts of lauroyl chloride is added dropwise to a stirred solution composed initially of 15 parts of alpha,alpha-dimethylbenzyl hydroperoxide and 15 parts of pyridine in about 200 parts of petroleum ether. The temperature of the mixture is maintained at a low level by immersing the vessel in an ice bath. After all the chloride is added, the ice bath is removed and the stirring continued for about 30 minutes. The solution is then washed with water, two portions of a 5% aqueous sodium bicarbonate solution and then dried. The solvent is evaporated and the resulting product identified as alpha,alpha-dimethylbenzyl peroxylaurate.

The alpha,alpha-dimethylbenzyl peroxylaurate produced above may be used to form substantially colorless castings from methyl methacrylate and diallyl succinate.

Example V

About 4 parts of acetyl chloride in petroleum ether is added with cooling and stirring to 150 parts of petroleum ether solution containing 9.8 parts of alpha,alpha-dimethyl-p-isopropylbenzyl hydroperoxide and 20 parts of pyridine. Cooling and stirring is continued for about 30 minutes after the addition is completed. At that time, the mixture is washed and dried over anhydrous sodium sulfate. The solvent is evaporated and the resulting product identified as alpha,alpha-dimethyl-p-isopropylbenzyl peroxyacetate.

The alpha,alpha - dimethyl-p-isopropylbenzyl peroxyacetate produced above is active as a polymerization catalyst for methyl methacrylate, styrene and allyl acetate.

Peresters having related properties as polymerization catalysts may be obtained by replacing the acetyl chloride in the above process with equivalent amounts of each of the following chlorides: acrylyl chloride, butyryl chloride, and the acid chloride of cyclohexanecarboxylic acid.

Example VI

About 4.4 parts of chloroacetyl chloride in petroleum ether is added with cooling and stirring to 150 parts of petroleum ether solution containing about 10 parts of alpha,alpha-dimethyl-p-methylbenzyl hydroperoxide and 15 parts of pyridine. Cooling and stirring is continued for about 30 minutes after the addition is completed and then the mixture is washed and dried. The solvent is evaporated and the resulting product identified as alpha,alpha-dimethyl-p-methylbenzyl peroxychloroacetate.

The perester produced above is particularly effective in polymerizing the vinyl monomers as methyl methacrylate at low reaction temperatures.

Peresters having related properties include alpha,alpha-dimethyl-p-methylbenzyl peroxytrichloroacetate and alpha,alpha-dimethylbenzyl peroxychlorobutyrate.

I claim as my invention:

1. An aromatic substituted-alkyl of a non-aromatic peroxycarboxylic acid of the group consisting of peroxyalkanoic acids and peroxyalkenoic acids containing at least two carbon atoms and their halo-substituted derivatives, the peroxycycloalkanoic acids and peroxycycloalkenoic acids containing at least 6 carbon atoms and their halo-substituted derivatives, diperoxyalkanedioic acids and the diperoxyalkenedioic acids containing at least four carbon atoms and their halo-substituted derivatives, the diperoxycycloalkanedioic acids and the diperoxycycloalkenedioic acids containing at least 7 carbon atoms and their halo-substituted derivatives, and the triperoxyalkanetrioic acids and the triperoxyalkenetrioic acids containing at least five carbon atoms and their halo-substituted derivatives.

2. An alpha,alpha-dialkyl-p-alkylbenzyl monoperester of a peroxyalkanoic acid containing from 2 to 20 carbon atoms.

3. An alpha,alpha-dialkyl-p-alkylbenzyl diperester of diperoxyalkanedioic acid containing from 4 to 20 carbon atoms.

4. An alpha,alpha-dialkyl-p-alkylbenzyl diperester of a diperoxyalkanedioic acid containing from 5 to 15 carbon atoms.

5. An arylalkyl monoperester of a chloro-substituted peroxyalkanoic acid containing from 2 to 20 carbon atoms.

6. An alpha,alpha-dimethyl-p-alkylbenzyl perester of a peroxyalkanoic acid containing from 5 to 15 carbon atoms.

7. An alpha,alpha-dialkyl benzyl diperester of a diperoxyalkanedioic acid containing from 4 to 20 carbon atoms.

8. Alpha,alpha-dimethylbenzyl peroxypelargonate.

9. Alpha,alpha-dimethyl-p-methylbenzyl peroxypelarogonate.

10. Alpha,alpha-dimethyl-p-methylbenzyl peroxylaurate.

11. Di - (alpha,alpha - dimethyl - p - methylbenzyl) diperoxysuccinate.

12. Alpha,alpha - dimethyl-p-alkylbenzyl peroxychloroacetate.

13. An alpha,alpha-dialkylbenzyl perester of a peroxyalkanoic acid containing from 2 to 20 carbon atoms.

FRANK H. DICKEY.

References Cited in the file of this patent

UNITED STATES PATENTS

| Number | Name | Date |
|---|---|---|
| 2,319,576 | Agens | May 18, 1943 |
| 2,567,615 | Milas | Sept. 11, 1951 |